Sept. 27, 1927.
L. ROUANET
SPLIT PULLEY
Filed March 5, 1926
1,643,611
2 Sheets-Sheet 1
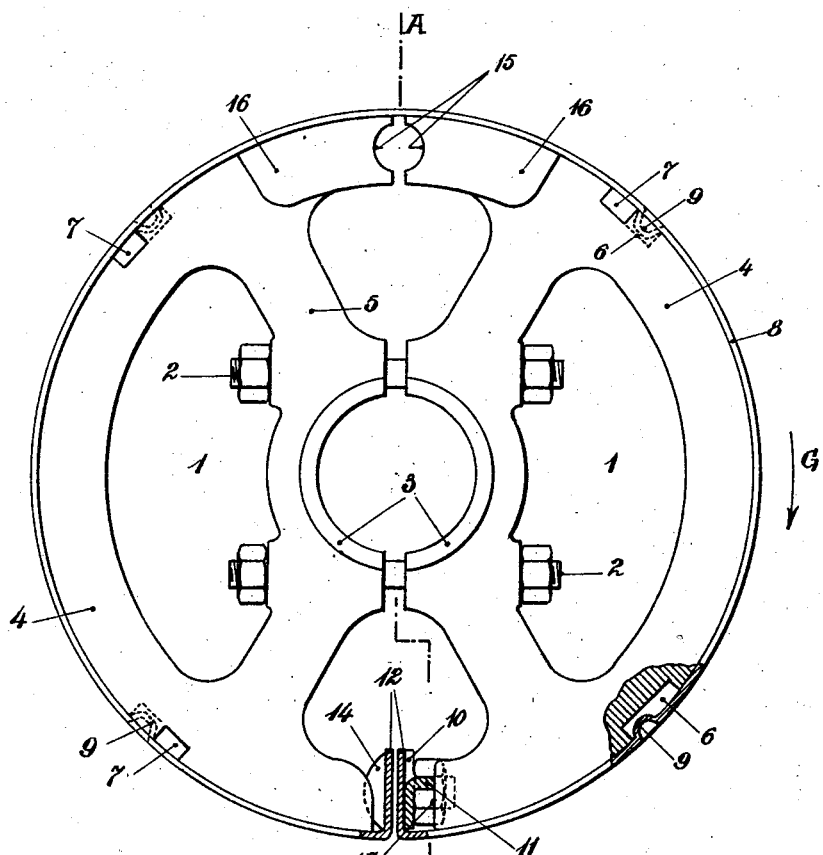
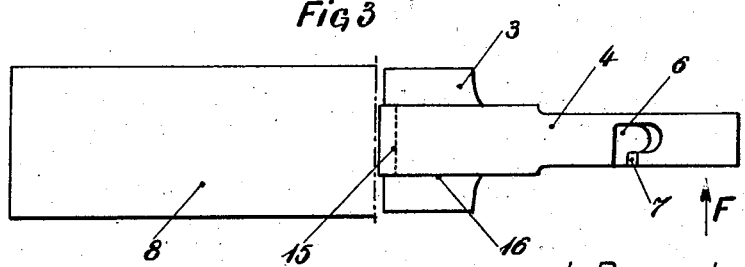
L. Rouanet
INVENTOR
By: Marks & Clerk Atty Sept. 27, 1927.    L. ROUANET    1,643,611
SPLIT PULLEY
Filed March 5, 1926    2 Sheets-Sheet 2

L. Rouanet
INVENTOR
By: Marks & Clerk
Attys

Patented Sept. 27, 1927.

1,643,611

UNITED STATES PATENT OFFICE.

LOUIS ROUANET, OF IVRY-PORT, FRANCE, ASSIGNOR TO COMPAGNIE D'APPLICATIONS MECHANIQUES, OF IVRY-PORT, FRANCE, A FRENCH COMPANY.

SPLIT PULLEY.

Application filed March 5, 1926, Serial No. 92,567, and in France April 11, 1925.

The present invention relates to a split pulley of the type comprising a hub part used for securing the pulley body upon a shaft, a rim or equivalent part, connecting means such as arms, spokes, discs, etc., between the said hub and rim parts, and a one piece outer band receiving the belt and assembling the constituent parts of the pulley.

The invention has for its object improvements in the method of securing the outer band on the pulley body, consisting in that notches or cavities, formed as "bayonet" joints, are provided on the rim part in order to enable the split outer band to be disposed in position on the latter without having recourse to the expansion process usually used, bosses, pins or equivalent means, projecting radially inward, towards the pulley shaft, being provided for this purpose on the outer band, said means providing also for both axial and circumferential guiding of the latter. This "bayonet" joint system between the pulley body and the outer band is moreover combined with a locking device preventing any relative circumferential displacement between said pulley body and the band, extra thicknesses of material or suitable housings for additional weights being provided on the pulley body opposite the connection in the outer band, in order to balance the weight of the bent-back ends of the latter and that of the locking device and of the clamping bolts.

Other features of the invention will appear more clearly from following description.

In the accompanying drawing, illustrating a practical embodiment of the invention:

Fig. 1 is a side elevation, with parts broken away, of a pulley constructed in accordance with the invention;

Fig. 3 is a plan view, the outer band being omitted on the right-hand half of the figure;

Figure 2:
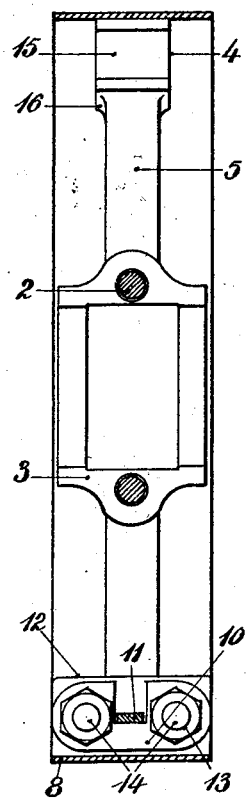
Fig. 2 is a sectional view taken along the line A—A of Fig. 1.
Figure 4:
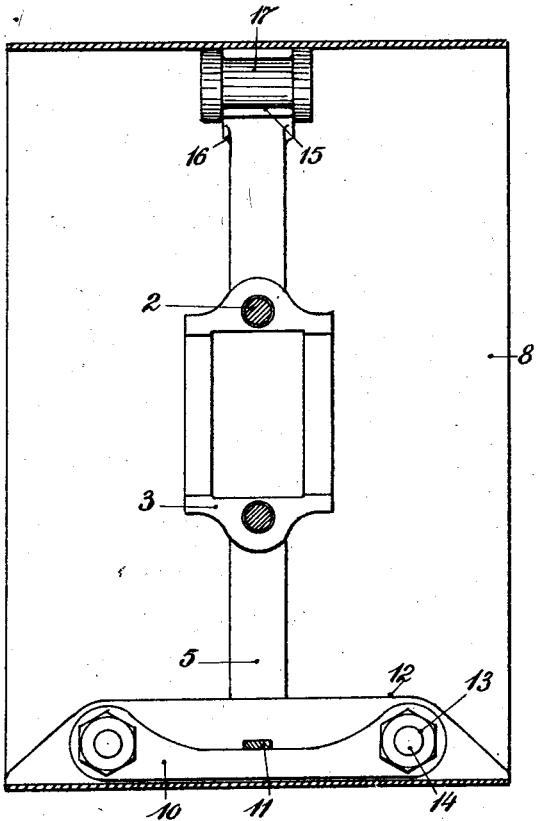
Fig. 4 is a view similar to that of Fig. 2, but showing a pulley with a wider outer band.

In Figs. 1 to 4 inclusive, the pulley body is divided into two approximately symmetrical parts 1, the said pulley body being secured upon a shaft (not shown) by means of bolts 2 extending through the hub part 3 which is connected to the rim 4 by means of the spokes 5.

According to the invention, the rim 4 is provided with notches or cavities 6 shaped like "bayonet" joints, the parts 7 of which run out to one of the lateral faces of the said rim 4, while the outer band 8 which is adapted to receive a belt has bosses 9 projecting radially inward towards the pulley shaft, the said bosses being pressed directly in the band itself in the example illustrated.

The bosses 9 are used in combination with a locking device to secure the outer band 8 in position on the pulley body both in axial and circumferential directions. The said locking device is composed of a member 10 having a perpendicular projection 11 formed thereon, and inserted between one of the bent ends 12 of the outer band 8 and the adjacent part of the rim, when the said outer band is mounted in operative position on the pulley body.

The locking member 10 has two openings 13 through which are passed the bolts 14, used for clamping the outer band 8 onto the pulley body.

To secure the outer band in position on the pulley body when the latter is already in operative position on a shaft, the following action occurs.

The outer band is placed around the shaft and brought up to the pulley body with the bosses 9 opposite the parts or branches 7 of the cavities or slots 6. The outer circle is then freely slipped onto the pulley body until the bosses 9 reach the ends of the branches 7 (see arrow F, Fig. 3), the outside diameter of the pulley rim 4 and the inside diameter of the outer band 8 being suitably determined to this end.

When the bosses 9 reach the ends of the branches 7 the outer band is in the proper axial position and it is then only necessary to bring it into the correct angular or circumferential position by rotating it around the pulley body (see arrow G, Fig. 1), the bosses 9 being guided in the slots or cavities 6. The outer band 8 being now in the desired position (both axial and angular), it is securely fastened in this position by inserting the locking member 10, which is introduced from the side. When the member 10 is properly placed between one of the bent ends 12 of the outer band and the adjacent end 4ª of the pulley rim, the openings 13 in the said member coincide with the holes bored in the bent ends 12 of the band to insert the bolts 14 which are used to clamp the outer circle or band 8 onto the pulley body.

It will be seen that the locking member 10 with the projection 11 acts as a spacing block between one of the bent ends 12 of the outer band and the pulley rim 4 of the pulley body, preventing any backward movement of the bosses 9 in the slots or cavities 6, and consequently any relative movement in circumferential direction between the said band and the said pulley body whilst the guiding in axial direction is obtained by means of the bosses 9, the diameter of which is suitably adapted to the width of the slots or cavities 6.

The devices used for balancing such types of pulleys are more particularly described and claimed in the divisional specification filed May 12, 1926, Serial Number 190,889.

Each part 1 of the pulley body has a groove 15 and an extra thickness of material 16 (integral with or secured to), formed at the point diametrically opposite the joint in the outer circle, said groove and extra thickness of material being designed so as to balance the weights of the bent ends 12 of the outer band, of the locking member 10, of the bolts 14 used to secure the band onto the pulley body, and eventually of any other unsymmetrical parts.

In the case of pulleys with wider outer bands the balance is obtained with the same pulley body by adding weights 17, made of more or less deformable material such as lead, specially designed for each size of outer band and clamped between the grooves 15 when the bolts 2, by means of which the pulley is held on the shaft, are being tightened.

Figure 5:
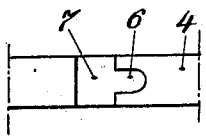
Fig. 5 shows an alternative form of "bayonet" joint.

Fig. 5 represents an alternative form of the invention according to which the branches 7 of the slots or cavities 6 forming the "bayonet" joints run out to both the lateral faces of the rim part 4, enabling the outer band 8 to be placed laterally on the pulley body 1—1 from either side thereof.

It is to be understood that the invention is not limited to the forms of construction described and represented which have been selected only as examples. Especially, the "bayonet" joints can be cast in with the pulley body or can be worked later on, just as the bosses may be made separately and attached to the outer band without modifying the nature of the invention.

Claims:

1. A split pulley comprising a two part body including a hub member, a rim member, connecting means between said hub and rim members, a removable outer band formed of a single split piece, inwardly projecting extensions on the inner face of the band and the outer face of the rim member provided with slots running out to one of its side faces with the inner ends of such slots angularly displaced around the pulley relative to their entrance ends, whereby the outer band may be slipped from the side in position onto the pulley body and is prevented from axial displacement relative to the latter.

2. A split pulley comprising a two part body including a hub member, a rim member provided on its outer face with lateral open ended slots, connecting means between said hub and rim members, a removable outer band formed of a single split piece, radially projecting extensions on the inner face of the band, and locking means between said rim and band whereby the latter may be slipped from the side in position on the pulley body and prevented from both axial and circumferential displacements relative to the latter.

3. A split pulley according to claim 2, having slots shaped like bayonet joints, the outer band being slipped into position onto the pulley body by axial and further by angular displacement.

4. A split pulley according to claim 2, wherein the ends of the removable band are bent and wherein the locking means includes a plate secured to the bent ends of the removable band, and a projection provided on the plate and acting as a spacing member between the said ends and one of the parts of the pulley body between which said ends are inserted.

LOUIS ROUANET.